April 1, 1930.  A. FARNER  1,752,902
DEVICE FOR DISINTEGRATING AND CONVEYING MATERIALS
Filed Aug. 15, 1927
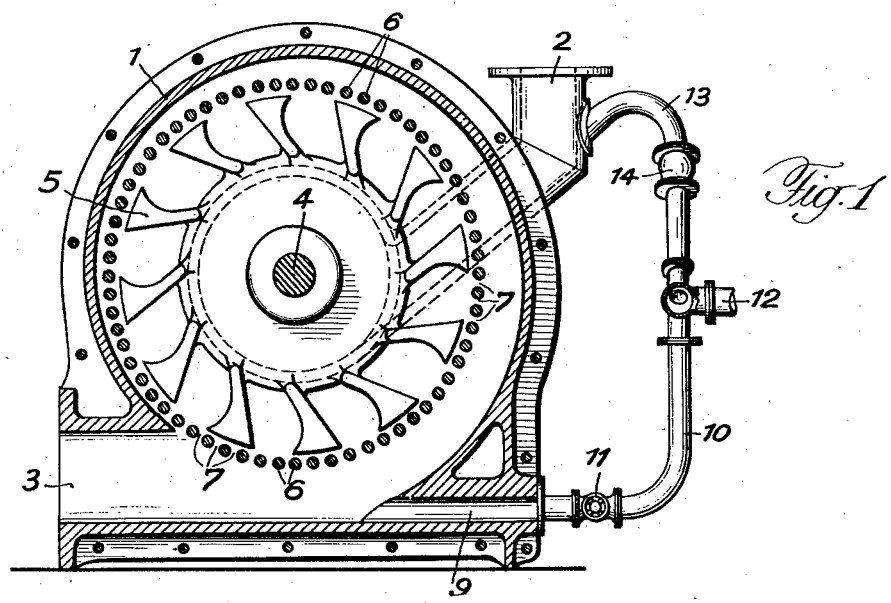
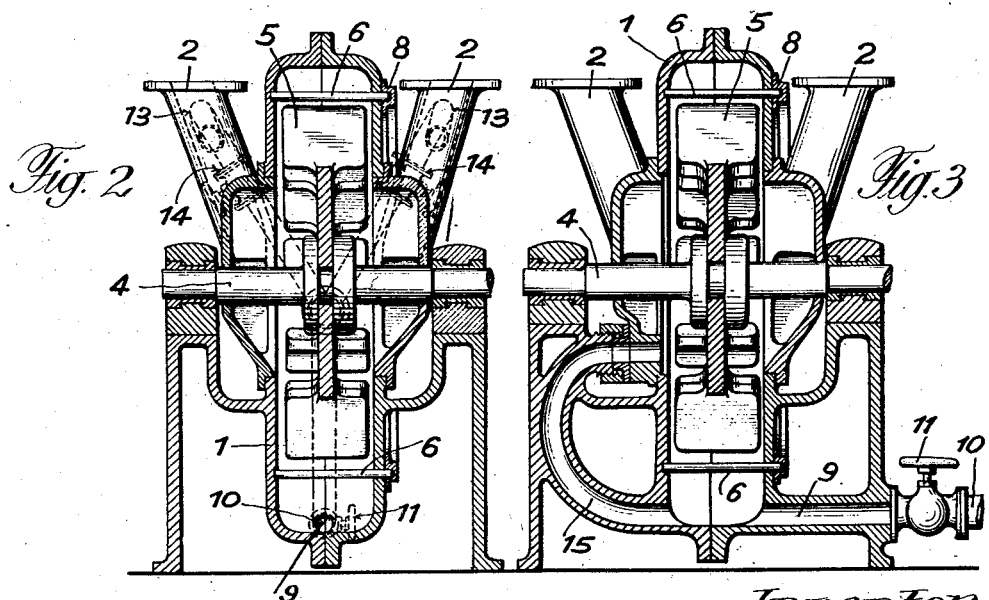

Patented Apr. 1, 1930

1,752,902

UNITED STATES PATENT OFFICE

AUGUST FARNER, OF KUSNACHT-ZURICH, SWITZERLAND

DEVICE FOR DISINTEGRATING AND CONVEYING MATERIALS

Application filed August 15, 1927. Serial No. 213,026.

The object of the present invention consists in providing a device for disintegrating and conveying sugar, wheat, coal and other materials by means of which the respective material is conveyed on the shortest way, which is of a simple construction, uses little driving power and takes up a small space.

To this end the disintegrating and conveying device forming the subject matter of the present invention is provided with a blower having a grid surrounding the rotor and inserted in the side walls of the blower, and against which the material to be disintegrated is projected and which is provided with passages for the treated material.

Two constructional examples of the subject matter of the present invention are illustrated on the accompanying drawings, in which Fig. 1 shows in elevation with parts indicated in section a first constructional example, Fig. 2 is a vertical section taken at right angles to Fig. 1, Fig. 3 is a vertical section similar to that of Fig. 2 of a second constructional example.

In the drawings 1 denotes the blower casing made of several parts and provided with two branches 2 to be connected to the suction conduit and a branch 3 to be connected to the discharge conduit. Within the casing 1 and on the shaft 4 the rotor 5 is mounted provided with rigid blades. Surrounding the rotor an anvil grid formed of rods 6 is provided, the rods being arranged at a distance from each other in the two side walls of the casing 1 so that passages 7 are formed between the rods 6. The latter are inserted from outside through holes provided in one side wall of the casing 1 and enter recesses provided in the other side wall of the casing 1. The rods 6 project somewhat beyond the walls of the casing through which they pass and are secured in position by a ring 8, which may be composed of single segments, screwed to that wall and covering the projecting ends.

Opposite to the discharge branch 3 and tangential to the rotor 5 a channel 9 is arranged in the blower casing 1 and a pipe 10 provided with a cock 11 is connected to the channel 9. The pipe 10 branches off a main conduit 12, from which two further branch pipes 13, each provided with a cock 14, lead to the two suction branches 2.

The material to be disintegrated is sucked by the action of the rotor 5 through the branches 2 into the casing 1 and is projected against the rods 6 of the grid whereby it is disintegrated and is then forced through the passages 7 of the grid and conveyed further through the discharge branch 3. The conveying of the disintegrated material may also be assisted by opening the cock 11 of the pipe 10 and leading thereby an auxiliary stream of air under pressure into the channel 9 which stream causes a suction action on the grid. Furthermore the pressure acting inside the casing 1 on the material on account of the rotation of the rotor may be increased by opening the cocks 14 of the pipes 13 and leading an auxiliary stream of air for conveying purposes through the branches 2 into the casing 1.

In this manner a regulation of the suction and pressure action inside the blower casing 1 is possible. Care has to be taken that the pressure present in the casing 1 of the blower does not cause a banking up of the material in the suction branches 2 and that dust generated by the disintegration of the material is not driven out into the room in which the device is placed or into the surrounding atmosphere. Obviously the power consumption of the rotor of the blower is the smaller the higher the vacuum is in which the rotor runs; if the conveying of the material disintegrated to dust is mainly caused by the action of the auxiliary stream from the channel 9 a high degree of fineness of this dust may be obtained without causing a considerable increase in the power consumed by the rotor, whilst with all the known disintegrating devices a higher degree of fineness of the treated material causes a power consumption which rises much quicker than the degree of fineness.

By varying the number of rods 6 forming the grid or by inserting rods of a smaller diameter, which may be carried out without dismantling the whole blower but simply by removing the ring 8, the width of the passages for the material in the grid may be altered to suit any desired degree of fineness of the disintegration.

The constructional example illustrated in Fig. 3 differs from that explained above inasmuch as the channel 9 is not arranged in a tangential manner to the grid but transversely to the casing 1. Opposite the channel 9 an auxiliary channel 15 is provided and directed radially from the periphery of the casing 1 towards the centre of the latter. With this constructional example by means of the auxiliary conveying stream material, which owing to its coarse grain does not leave the disintegrator through the discharge branch 3 but collects in the casing, is brought back into the rotor 5 by the auxiliary channel 15 and is again projected against the grid by the rotor.

Atmospheric air or heated air or any other gas may be used for the conveying stream and for the auxiliary conveying stream.

I claim:

1. A device for disintegrating and conveying materials, comprising a blower having a casing provided with a delivery branch, a fan rotor in the casing whose blades are formed as crushing members, an anvil grid of separately removable bars surrounding the rotor, said grid and rotor being mounted excentrically to the casing, means to supply pressure air to said delivery branch and means to connect the delivery branch to the eye of the rotor to admit pressure air thereto.

2. In a device for disintegrating and conveying material, a blower having a casing and a rotor, a delivery branch and a suction branch on said casing, an anvil between the casing and rotor, said rotor having fan arms co-operating with said anvil to comminute material and means to return material that has passed said anvil into comminuting space between anvil and rotor by the pressure of the air produced by said rotor.

3. In a device for disintegrating and conveying material, a blower having a casing provided with a suction and a delivery branch, a rotor in the casing comprising a series of hammer arms constructed as fan blades, an anvil grid between said arms and casing and means to conduct material that has passed through said grid to the casing near its center by the air compressed by said blades.

4. In a device for disintegrating and conveying material, a blower having a casing provided with a suction branch discharging into the casing near its center and a valved discharge branch near its periphery, a rotor in said casing comprising a series of hammers constructed as fan blades and casing, and a conduit connecting the bottom of the casing, with its center to return material that has passed the anvil for regrinding by the air compressed by said blades.

In testimony whereof, I have signed my name to this specification.

AUGUST FARNER.